United States Patent
Pallante et al.

(10) Patent No.: US 8,137,745 B2
(45) Date of Patent: Mar. 20, 2012

(54) HOT MELT ADHESIVE SYSTEM AND METHOD USING MACHINE READABLE INFORMATION

(75) Inventors: Rick Pallante, Atlanta, GA (US); John M. Raterman, Atlanta, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 12/765,312

(22) Filed: Apr. 22, 2010

(65) Prior Publication Data

US 2010/0203230 A1 Aug. 12, 2010

Related U.S. Application Data

(63) Continuation of application No. 10/699,404, filed on Oct. 31, 2003, now abandoned.

(51) Int. Cl.
*C23C 16/52* (2006.01)
*B05C 11/10* (2006.01)
*B05D 5/10* (2006.01)

(52) U.S. Cl. ...... 427/208.2; 427/207.1; 427/8; 118/663; 118/665; 118/697; 118/712

(58) Field of Classification Search ............... 427/207.1; 118/663, 667, 300
See application file for complete search history.

(56) References Cited

U.S. PATENT DOCUMENTS

| | | | |
|---|---|---|---|
| 4,467,961 A | 8/1984 | Coffee et al. | |
| 4,537,150 A | 8/1985 | Bowers | |
| 4,907,741 A | 3/1990 | McIntyre | |
| 5,406,315 A | 4/1995 | Allen et al. | |
| 5,700,322 A | 12/1997 | Fort | |
| 5,718,767 A | 2/1998 | Crum et al. | |
| 5,719,378 A * | 2/1998 | Jackson et al. ............... 219/497 |
| 5,808,559 A | 9/1998 | Buckler | |
| 5,814,790 A * | 9/1998 | Bondeson et al. ............ 219/421 |
| 5,882,451 A * | 3/1999 | Sasaki et al. ................... 156/64 |
| 6,190,739 B1 * | 2/2001 | Hoffer et al. ................. 427/424 |
| 6,758,423 B1 | 7/2004 | Perkins et al. | |
| 6,943,678 B2 | 9/2005 | Muirhead | |

(Continued)

FOREIGN PATENT DOCUMENTS

EP  0 601 867 A1  6/1994

(Continued)

OTHER PUBLICATIONS

European Patent Office; Search Report in European Patent Application No. 04818594.6 dated Mar. 15, 2007; 3 pages.

(Continued)

*Primary Examiner* — Timothy Meeks
*Assistant Examiner* — Cachet Sellman
(74) *Attorney, Agent, or Firm* — Wood, Herron & Evans, LLP

(57) ABSTRACT

A hot melt adhesive system includes a melting unit configured to liquefy a bulk form of hot melt adhesive and deliver the liquefied hot melt adhesive to an application location. The melting unit includes a controller for establishing and/or verifying at least one system condition, such as temperatures associated with system operation. A machine reading unit is coupled with the controller and is capable of receiving information from a machine readable element and communicating the information to the controller for use in establishing and/or verifying the system condition. A method of operating the system includes scanning information on at least one system condition into the controller from a machine readable element, and using the scanned information during operation of the melting unit.

19 Claims, 2 Drawing Sheets

U.S. PATENT DOCUMENTS

| | | |
|---|---|---|
| 7,012,530 B2 | 3/2006 | Droz |
| 2002/0170966 A1 | 11/2002 | Hannigan et al. |
| 2003/0148018 A1 | 8/2003 | Hoffmann et al. |
| 2004/0222300 A1 | 11/2004 | Strickland |
| 2004/0224086 A1* | 11/2004 | Wright .................. 427/207.1 |
| 2006/0127584 A1 | 6/2006 | Lande et al. |
| 2006/0243174 A1 | 11/2006 | Muirhead |

FOREIGN PATENT DOCUMENTS

| | | |
|---|---|---|
| EP | 0 880 998 A2 | 12/1998 |
| JP | 10-162937 A | 6/1998 |
| JP | 2003-150229 | 5/2003 |
| JP | 2003-266014 A | 9/2003 |
| WO | 01/79111 A1 | 10/2001 |
| WO | WO 0179111 A1 * | 10/2001 |

OTHER PUBLICATIONS

European Patent Office; Written Opinion in International Patent Application No. PCT/US2004/033840 dated May 23, 2005; 8 pages.

Japanese Patent Office; Office Action in Japanese Patent Application No. 2006-538050 dated Jul. 27, 2010; 4 pages.

* cited by examiner

HOT MELT ADHESIVE SYSTEM AND METHOD USING MACHINE READABLE INFORMATION

CROSS REFERENCES

This application is a continuation of application Ser. No. 10/699,404, filed Oct. 31, 2003 (pending), the disclosure of which is hereby incorporated by reference herein in its entirety.

TECHNICAL FIELD

The present invention pertains to dispensing systems for dispensing flowable material, and more particularly to hot melt adhesive dispensing systems.

BACKGROUND

Thermoplastic adhesives, otherwise known as "hot melt" adhesives have been widely used in industry for adhering many types of products. Hot melt adhesive dispensing systems generally include a dispenser coupled with one or more dispensing guns, heated hoses fluidly connected to the guns, and a melting unit for melting and supplying heated liquid adhesive to the guns through the heated hoses. The melting units of conventional hot melt adhesive systems typically include a tank, a heater, a pump, a pump manifold, and a controller. The heater is generally located in a base of the tank for melting and heating adhesive material received into the tank in solid or semi-solid form. The pump manifold has an inlet connected to the tank and has multiple outlet ports adapted for connection to the heated hoses.

After the adhesive material is melted and heated in the tank, a pump operatively coupled to the tank and the pump manifold pumps liquid adhesive from the tank, through the pump manifold and heated hoses to the dispensing guns. Typically, the guns are connected to their own manifold. The controller controls the power supplied to the tank heater and heated hoses to maintain the liquid adhesive at an appropriate viscosity and temperature, depending on the application. The controller is also used to control many other operations of the system.

Before an adhesive dispensing operation can begin, the operator must ensure that the system parameters are set to values that are appropriate for the particular adhesive being used, as well as for the application needs. As some examples, system conditions such as adhesive application temperature, set back temperature, and over-temperature conditions should be set in the controller. If the system parameters are incorrectly set, various problems can arise such as overheating and charring of the adhesive, or underheating of the adhesive which could result in operational problems and adhesive bonding problems. Various other conditions may need to be set to establish a proper dispensing cycle. For example, there will be a delay time between when the system is turned on and the time that actual dispensing can take place.

A need therefore exists for a hot melt adhesive dispensing system having the ability to better ensure that system parameters are properly set in the controller. It would also be desirable to enable an operator to more easily and positively establish system conditions appropriate to the adhesive being processed, and efficiently utilize information related to system operation.

SUMMARY OF THE INVENTION

The present invention generally relates to a hot melt adhesive system including a melting unit and a controller coupled to a suitable machine reading unit which can receive information from a machine readable element and communicate that information to the controller. The melting unit is configured to liquefy a bulk form of hot melt adhesive and deliver the liquefied hot melt adhesive to an application location. The controller establishes or verifies at least one system condition and the information received from the machine reading unit is used by the controller to verify or establish the system condition.

As examples, the machine reading unit may take the form of a bar code reader or magnetic strip reader, however any other machine readable element and appropriate device for reading the element may be used. The system condition or conditions which are established based on the information received by the machine reading unit can, for example, include the application temperature of the hot melt adhesive, an over-temperature condition of the hot melt adhesive, a set-back temperature of the adhesive, or other conditions, such as warnings or parameters associated with a system flushing operation.

The invention further provides a method of operating a hot melt adhesive system having a controller operating a melting unit. The method includes scanning information on at least one system condition into the controller from a machine readable element, and using the scanned information during operation of the melting unit. Using the scanned information can further comprise setting appropriate temperature conditions, warning conditions, system flushing parameters. Other uses involve collecting information such as adhesive identification information or information indicating the amount of adhesive processed by the melting unit. Any information of the type used in carrying out this invention may also be logged into a database for various diagnostic or analytical purposes. Preferably, the information is located directly on the container in which the bulk hot melt adhesive typically is packaged. This may involve, for example, a bar code or other machine readable element affixed to or forming part of the container. A conventional bar code scanner, magnetic strip scanner, or other device may be used which is appropriate for the machine readable element.

Various advantages are realized from this invention, including the ability to quickly and positively download any necessary system parameters associated with a particular system operational procedure or type of adhesive. The parameters for each type of adhesive may be contained on the machine readable element associated with the bulk container of the adhesive which is then scanned or read in just prior to system operation as opposed to relying on the operator to input such information manually. Various system warnings may alert personnel if the type of adhesive is changed during a manufacturing operation, or if the settings are different than those recommended by the adhesive manufacturer. By scanning or reading adhesive information, such as lot numbers, into the controller, a defective lot of adhesive may be more easily identified. If each bulk container is scanned or read, then the amount of adhesive used in a given time period may be determined and tracked. Any or all information can be logged into a database for purposes such as verifying that all adhesive types are being applied under the proper conditions. The invention further contemplates hot melt adhesive containers of bulk adhesive material having such machine readable elements affixed thereto in any suitable manner allowing information to be input upon delivery of the container to an operator.

These and other features, advantages and objectives of the invention will become more readily apparent to those of ordinary skill in the art upon review of the following detailed description of the preferred embodiments, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the details of the preferred embodiments.

DETAILED DESCRIPTION OF THE PREFERRED EMBODIMENTS

The inventive principles will be described below in connection with a specific description of a hot melt adhesive system 10, however, it should be understood that the invention is applicable to many other types of systems and is not limited to the details described below. The various components described below may be modified, eliminated, added to, and generally assembled in many different manners.

Figure 1:
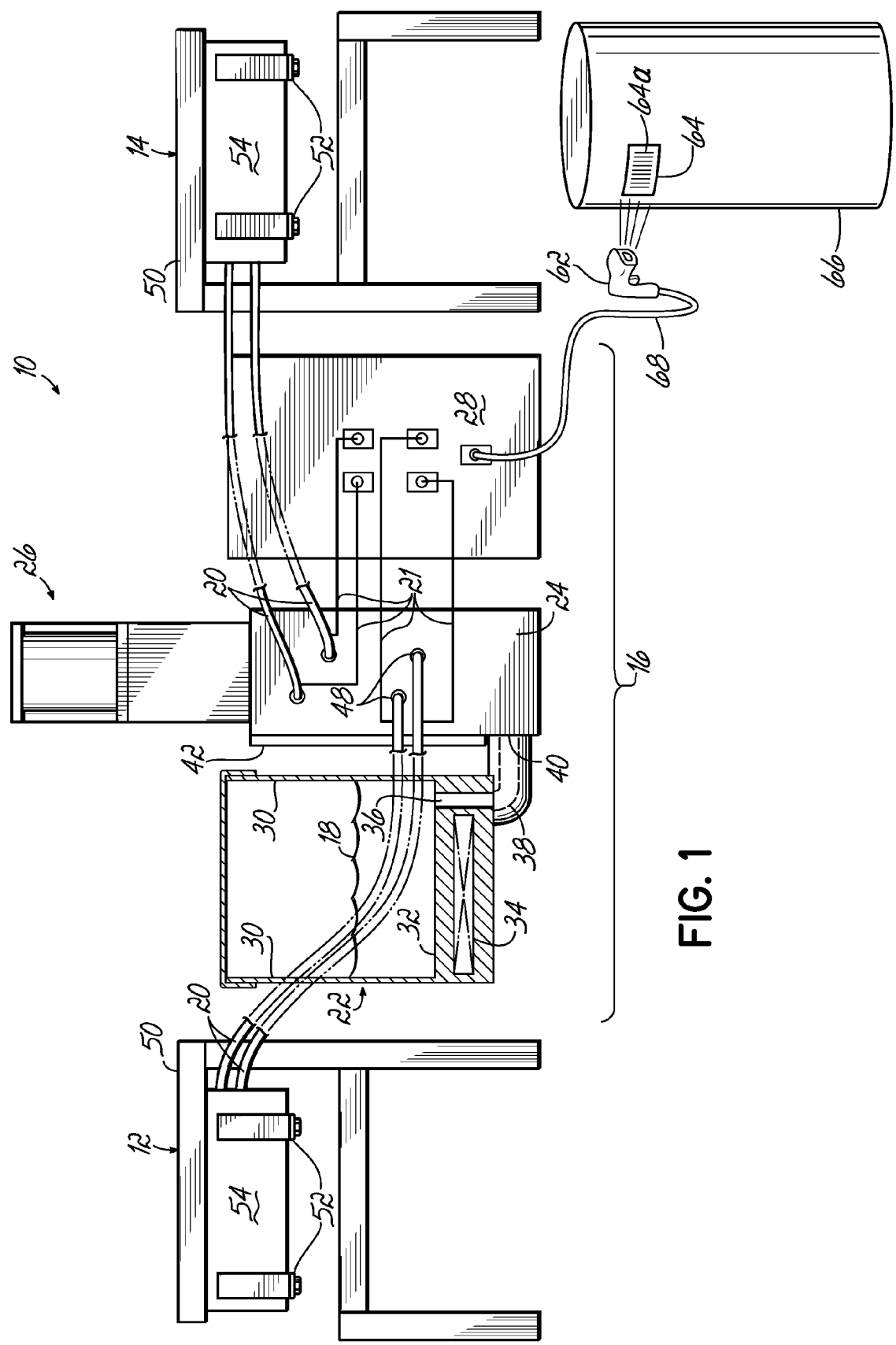
FIG. 1 is a schematic drawing of a hot melt adhesive system, including a melting unit, controller and bar code scanner configured according to one illustrative embodiment of the present invention.

Referring to FIG. 1, a hot melt adhesive system 10 includes a pair of adhesive guns 12, 14, a dispensing unit 16 for supplying adhesive 18 to the guns 12, 14, and heated hoses 20 connecting the dispensing unit 16 to the guns 12, 14. Cord sets 21 are used to heat and control the temperature of hoses 20 in a known manner. The dispensing unit 16 includes a tank 22 for receiving and melting hot melt adhesive 18, a manifold 24 in fluid communication with the tank 22, a pump 26 constructed according to the principles of the present invention and coupled to the manifold 24, and a controller 28. The tank 22 comprises side walls 30 and base 32 which includes a tank heater 34 for melting and heating the adhesive material 18 in the tank 22. A tank outlet 36 proximate the base 32 is coupled to a passage 38 which connects to an inlet 40 of the manifold 24.

The manifold 24 is located adjacent the tank 22 and includes a manifold heater 42 that is separate from the tank heater 34 and which may be independently controlled by the controller 28. Pump 26 is coupled to the manifold 24 and pumps liquid adhesive 18 from the tank 22, through a filter (not shown) removably disposed within the pump 26, and into the manifold 24. The manifold 24 splits the adhesive 18 into separate flows 46 and directs the flows 46 to a plurality of outlet ports 48. The plurality of outlet ports 48 are configured to be coupled to the heated hoses 20 whereby the liquid adhesive 18 is supplied to the guns 12, 14.

The guns 12, 14 may be mounted to a frame 50 and include one or more adhesive dispensing modules 52 which apply the adhesive 18 to a desired product (not shown). Modules 52 may be coupled to their own manifolds 54 for supplying adhesive, actuating air and process air thereto. The hot melt adhesive system 10 illustrates two gun manifolds 54 each supplied by a single hose 20, however, a second hose 20 is shown on each side of system 10 and may supply additional gun manifolds (not shown) located respectively behind manifolds 54. Other hot melt systems may have a single gun, or may have other guns and the guns and other components of the system may take on many different configurations, according to the particular adhesive dispensing requirements without departing from the scope of the present invention.

Still referring to FIG. 1, in accordance with one embodiment of this invention, a bar code reader or scanner 62 is coupled to the controller 28 and is operable to read a conventional bar code label 64 which may, for example, be affixed to a bulk container 66 of hot melt adhesive. The scanner or reader 62 may be hand held as shown, or may be fixed in place such that the container 66 may be brought within sufficient proximity to enable reading of the bar code 64a. The bar code reader 62 is capable of receiving information from the bar code 64a and communicating that information to the controller 28 for use in establishing and/or verifying various system parameters or conditions. Typically these conditions, such as adhesive application temperature, over temperature, setback temperature, as well as other setup conditions are inputted into the controller 28 through various methods. For example, they may be entered manually through a control pad, as is conventional, or they may be entered via a remote computer or other electronic device via any number of ways including, but not limited to, the Internet, an intranet, infrared devices, other wireless devices, memory cards, etc. Other conditions may also be set based on information contained on the label 64 or other machine readable element. For example, various dispensing cycle parameters may be set or verified relative to cycle times, on/off or dispensing time delays, etc. This includes various system warnings, adhesive information, and other data collection which may be used for diagnostic or analytical purposes. The information obtained from the label 64 or machine readable element is electrically transmitted to the control 28 via a cable 68 which may comprise a conventional programmable logic controller (PLC) or other microprocessor based control system configured to communicate with the bar code reader 62. Element 64 could instead be an embedded electronic chip which is readable via a portable wand or other reading device, or which is read upon coming into proximity with such a reader which is part of system 10, such as within controller 28.

Figure 2:
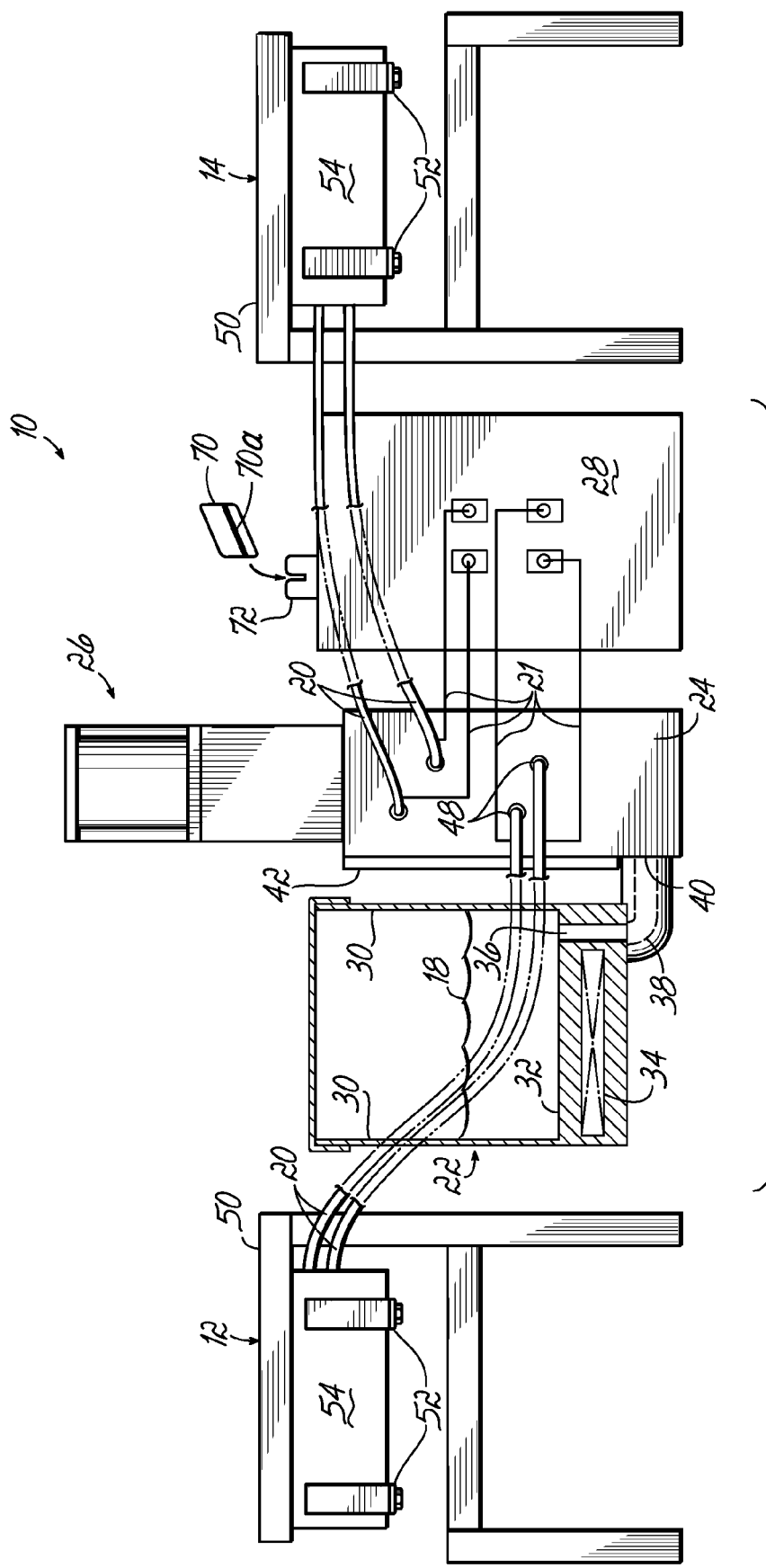
FIG. 2 is a schematic drawing similar to FIG. 1, but illustrating an alternative scanner and machine readable element of magnetic form.

As illustrated in FIG. 2, one of many alternative types of machine readable elements and scanners may comprise a suitable card 70 having a magnetic strip 70a and a scanner or reader 72 configured to receive the information from the magnetic strip 70a. The machine readable element, in this case being a card with a magnetic strip 70, may be separable and/or independent of the container 66 of hot melt adhesive. For example, an operator may be supplied with a card 70 detachable from the hot melt adhesive container 66, or the card 70 may be chosen by the operator from a set of cards at the system workstation based on the set of parameters desired, for example, related to a particular type of adhesive. The card 70 may transmit information to the control 28 in manners such as those described above with respect to FIG. 1. All other components shown in FIG. 2 have like reference numerals and thus have been described in connection with FIG. 1 as well. The present invention, and its various aspects, may be implemented using many other types of machine readable elements including, but not limited to, other elements which rely on any wireless communication technology, such as radio frequency (RF) technology (such as RFID tags or transponders), WiFi technology and magnetic devices of various types.

It will be appreciated that the present invention may be used in many different manners to improve the operation of a hot melt adhesive dispensing system. By scanning (i.e., transmitting) the machine readable element on the container of adhesive, such as a drum or other type of container, the particular operational parameters corresponding to that adhesive may be automatically downloaded into the system controller 28. This minimizes the possibility of error in the system operational parameters. In addition, process conditions can be verified with the operator before operation of the system. For example, if a container is scanned and is providing different information from the previously scanned container, the control system can prompt the operator to confirm that the change in adhesive is desired. This ensures that an incorrect adhesive is not inadvertently used in the middle of a manufacturing operation potentially resulting in system downtime and product scrap. In addition, the system controller can track whether settings different from those recommended by an adhesive manufacturer are being used during operation of the system 10 to assist with diagnosing maintenance or other problems with the system 10. During a system flushing operation, scanning a machine readable element with system flushing information can adjust the controller settings appropriate to the system flush procedure. After the system flush, rescanning the adhesive container label or other machine readable element associated with the particular hot melt adhesive, will return the controller 28 to the hot melt adhesive application settings. Finally, the controller 28 can also receive information appropriate to tracking the amount and type of adhesive being used in system 10. This can aid in determining whether a particular lot or batch of adhesive was defective and track use of the system 10 for purposes of scheduling appropriate maintenance. Logging of application data can provide confirmation and certification that the adhesive is being applied under the appropriate settings.

While the present invention has been illustrated by the description of various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A method of operating a hot melt adhesive dispensing system having a controller operating a melting unit, the method comprising:
   wirelessly receiving information from a machine readable element identifying a hot melt adhesive to be dispensed,
   the controller utilizing the received information to set a system operating condition of the hot melt adhesive dispensing system, and
   operating the hot melt adhesive dispensing system according to the system operating condition to dispense the hot melt adhesive.

2. The method of claim 1, wherein the information is received from a container of the hot melt adhesive.

3. The method of claim 1, further comprising:
   optically receiving the information from the machine readable element.

4. The method of claim 1, further comprising:
   magnetically receiving the information from the machine readable element.

5. The method of claim 1, further comprising:
   electronically receiving the information from the machine readable element.

6. The method of claim 5, further comprising:
   receiving the information through a radio signal.

7. The method of claim 1, further comprising:
   receiving the information from an electronic chip.

8. The method of claim 7, wherein said electronic chip is carried on a container of the hot melt adhesive.

9. The method of claim 8, further comprising:
   receiving the information from the electronic chip with a portable machine reading unit.

10. The method of claim 8, further comprising:
    receiving the information from the electronic chip automatically when the container of hot melt adhesive comes within proximity to the hot melt adhesive system.

11. The method of claim 1, wherein utilizing the wirelessly received information further comprises:
    setting an application temperature of the hot melt adhesive.

12. The method of claim 1, wherein utilizing the wirelessly received information further comprises:
    setting an over-temperature condition of the hot melt adhesive.

13. The method of claim 1, wherein utilizing the wirelessly received information further comprises:
    establishing and/or verifying a set-back temperature of the hot melt adhesive.

14. The method of claim 1, wherein utilizing the wirelessly received information further comprises:
    setting a warning condition in the controller.

15. The method of claim 1, wherein utilizing the wirelessly received information further comprises:
    setting a system flushing condition in the controller.

16. The method of claim 1, wherein wirelessly receiving information further comprises:
    wirelessly receiving information identifying the hot melt adhesive processed in the melting unit.

17. The method of claim 1, wherein utilizing the wirelessly received information further comprises:
    determining an amount of the hot melt adhesive processed in the melting unit.

18. The method of claim 1, further comprising:
    logging the wirelessly received information into a database.

19. The method of claim 1, wherein wirelessly receiving information further comprises:
    wirelessly receiving information located on a container of the hot melt adhesive.

* * * * *